INVENTOR.
ALFRED P. FEDERMAN
BY
ATTORNEYS.

INVENTOR.
ALFRED P. FEDERMAN
BY
ATTORNEYS.

Feb. 21, 1961

A. P. FEDERMAN 2,972,172

METHOD FOR FEEDING LIQUID CASTING
MATERIAL INTO AN ARTICLE MOLD

Filed Jan. 22, 1958

*INVENTOR.*
ALFRED P. FEDERMAN
BY

ATTORNEYS.

Feb. 21, 1961 A. P. FEDERMAN 2,972,172
METHOD FOR FEEDING LIQUID CASTING
MATERIAL INTO AN ARTICLE MOLD
Filed Jan. 22, 1958 8 Sheets-Sheet 4

INVENTOR.
ALFRED P. FEDERMAN
BY
ATTORNEYS.

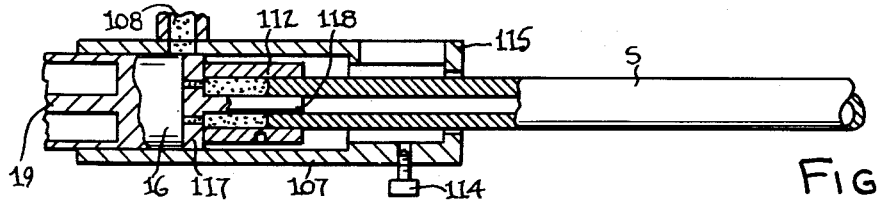
FIG. 27
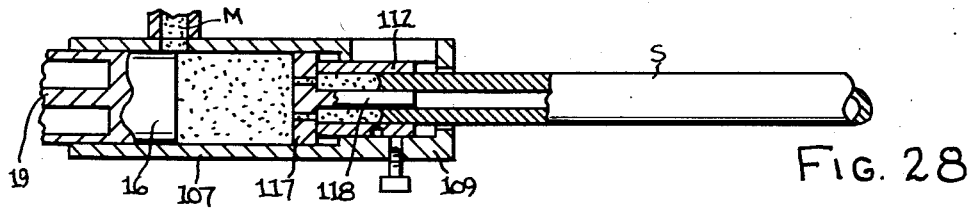
FIG. 28
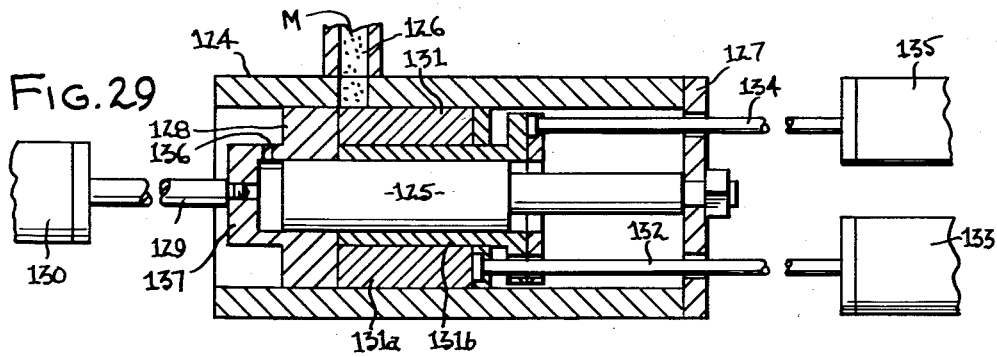
FIG. 29
FIG. 30
FIG. 31
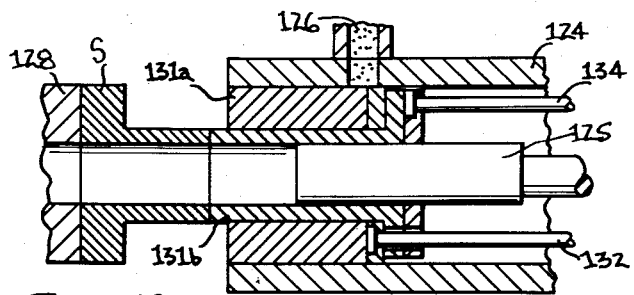
FIG. 32
INVENTOR.
ALFRED P. FEDERMAN
BY
ATTORNEYS.

INVENTOR.
ALFRED P. FEDERMAN
BY
ATTORNEYS.

Feb. 21, 1961

A. P. FEDERMAN 2,972,172

METHOD FOR FEEDING LIQUID CASTING
MATERIAL INTO AN ARTICLE MOLD

Filed Jan. 22, 1958

INVENTOR.
ALFRED P. FEDERMAN
BY
ATTORNEYS.

United States Patent Office 2,972,172
Patented Feb. 21, 1961

2,972,172

METHOD FOR FEEDING LIQUID CASTING MATERIAL INTO AN ARTICLE MOLD

Alfred P. Federman, 3690 Strandhill Road, Shaker Heights, Ohio

Filed Jan. 22, 1958, Ser. No. 710,460

11 Claims. (Cl. 22—209)

The present invention relates generally to the field of casting molten metals and other molten materials which are adversely affected by dissolved gases, air entrapment, oxidation or other chemical action in the liquid state. Although the invention has particular applicability to the feeding of molten metal in pressure casting operations, and is so described herein, it also has utility in allied fields of sand casting, injection casting, permanent mold casting and the like.

In the field of pressure die-casting, constant efforts are being made to improve existing methods and apparatus in order to overcome the problems created by the body of air which normally is present in the die cavity and in the metal feed passageways which lead to the die cavity. In the die cavity, the contained air is removed to a greater or lesser extent by venting the cavity as the metal displaces the air, or by evacuating the air from the cavity by connecting it to a vacuum source. Likewise, efforts have been made to clear the feed channels of air by evacuation or displacement venting. These efforts have been directed to minimize turbulence, oxidation, air entrapment and porosity and thus improve the physical characteristics of the cast product as well as to decrease the operating pressures required.

In non-pressure casting, similar problems are created by the body of air in the mold and the pouring, through air, of the molten metal from a pot or ladle into the article-forming cavity and the passageways leading thereto.

In my copending application, Serial No. 560,234, filed January 19, 1956, for Vacuum Die Casting Method and Apparatus, I have disclosed a vacuum die-casting apparatus in which the removal of the air from the die-cavity and the entry passageways was emphasized. It is a primary object of the present invention to provide a feeding system for the molten metal, wherein an air-less chamber is utilized to meter and transfer the metal to the die or mold. This system contemplates a variable volume chamber which does not require the evacuation or displacement of air, as it is initially free of contained air and this condition is maintained throughout the feeding cycle by isolating the chamber from any exposure to air.

It is another object of my invention to provide an apparatus and method for feeding liquid material to an article-forming cavity whereby turbulence is minimized and air entrapment and oxidation is eliminated.

Still another object of my invention is to provide an automatic feeding apparatus of the character described which can be successfully utilized for corrosive metals, such as molten aluminum, in lieu of the conventional ladling or other processes.

Another object of my invention is to provide an apparatus and process for feeding molten material to a pressure die cavity, which permits the feed cycle to be initiated prior to the closing of the dies, thus accelerating the overall operational die-casting time cycle.

Still another object of my invention is to provide means for transferring a uniform, metered charge of molten material at a controlled speed or velocity directly to the lower portion of an open-vent mold whereby to minimize the exposure of the molten material to air.

Another object of my invention is to provide means for transferring molten material from one receptacle to another at subatmospheric pressures.

Still another object of my invention is to provide a method and means for the continuous or intermittent casting of extrudable shapes, either of hollow or solid cross-section.

Another object of my invention is to provide a method and means for utilizing inert gases for effecting air displacement in molds prior to injection of molten material therein.

A further object of my invention is to provide an apparatus and process of the character described, which will produce a cast article having improved physical characteristics.

Other objects and advantages of my invention will be apparent during the course of the following description.

In the accompanying drawings forming a part of this specification and in which like numerals are employed to designate like parts throughout the same, Figs. 1 to 9, inclusive, are sectional views of an injection apparatus embodying the features of my invention, and illustrate the sequence of operation of the apparatus.

Figs. 27 and 28 are views of the apparatus of Figs. 20–26 but illustrating a modified method of operation thereof for continuous casting.

Figs. 29 to 32 are sectional views of a modified form of the apparatus of Fig. 16 and showing the sequence of operation thereof.

Figure 1:
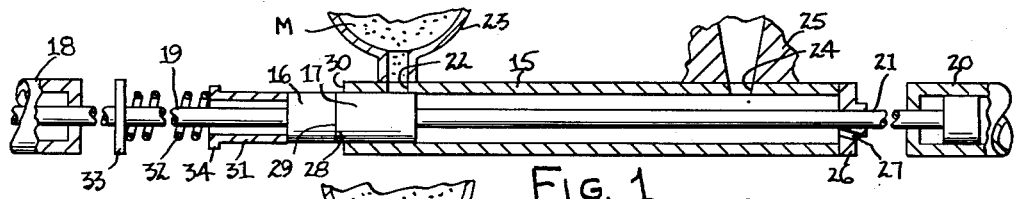

Referring more particularly to Figs. 1–9, inclusive, of the drawings, I have shown the method of operation of one form of die-casting or pressure casting apparatus which utilizes the principles of my invention. A hollow charging receptacle or sleeve 15 is disposed horizontally and slidably retains an injection plunger 16 and a metering plunger 17 which are reciprocable within the sleeve 15. Conveniently, the sleeve and the plungers are of cylindrical form.

The plungers 16 and 17 are moved or actuated by any suitable means, which are here shown as a hydraulic cylinder assembly 18 having its piston rod 19 secured to the plunger 16; and a hydraulic cylinder assembly 20 having its piston rod 21 secured to the plunger 17.

By means of an aperture or port 22 in the upper wall of the sleeve 15, the interior of the sleeve communicates with a reservoir of the molten material M. This reservoir may be a suitable vessel or melting pot 23 which will maintain a desired quantity of the material in its liquid or molten phase.

By means of another aperture or port 24 in the wall of the sleeve 15, the interior of the sleeve communicates with an article-forming cavity in the form of a separable die or mold 25. Thus, the aperture 22 provides a metal entry port into the sleeve, and the aperture 24 provides a metal injection port into the die or mold.

For clarity I have shown the ports 22 and 24 and the parts 23 and 25 as being in longitudinal alignment on the sleeve 15. It will be understood that the ports may be angularly disposed relatively to each other and the die may also be angularly disposed relatively to the port 22, if convnient or desirable.

Both ends of the charging sleeve 15 may be open to atmosphere. However, to permit greater versatility of operation, I prefer to seal or close one end of the sleeve, adjacent to the injection port 24, with a removable cap 26 which is traversed by the piston rod 21 and which is provided with an aperture 27. The aperture 27 can serve as an atmospheric vent or, as will become apparent in the course of the description, the aperture 27 can communicate with a vacuum-producing source to cause evacuation of the cavity of the die 25.

The plungers 16 and 17 are selctively movable independently of each other and each plunger has a multiple function in the operation of the apparatus. The opposed plungers 16 and 17 serve to define, within the sleeve 15, a variable volume movable chamber or charge receptacle for the molten metal. The plunger 16 also serves as a valve for the metal entry port 22 and serves as the means for injecting the metal into the die cavity. The plunger 17 serves to define and limit the volume of the metal charge and also serves as a valve for the injection port 24 and the metal entry port 22.

The method of operation of the apparatus is shown in Figs. 1–9 in the position of the parts during the various steps of the operating cycle.

Figure 2:
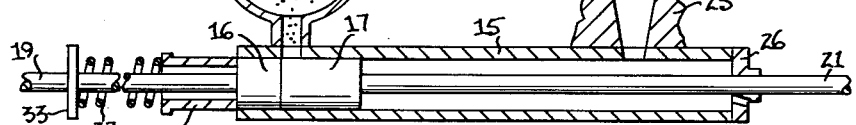

In Fig. 1, the plungers 16 and 17, which have complementary opposed ends or faces 28 and 29, respectively, are in face-to-face abutment exteriorly of the open end 30 of the sleeve 15. As here shown, the faces 28—29 may be flat and normal to the axis of the sleeve. It will be noted that a portion of plunger 17 overlies and blocks the metal entry port 22, thus, preventing any flow of molten metal M from the reservoir vessel 23 into the interior of the sleeve 15. The plungers are maintained in abutment and are simultaneously moved to the right, into the sleeve 15, until the faces 28 and 29 of the plungers are in registry or communication with the metal entry port 22, as shown in Fig. 2. The plunger 16 is then held against further movement while the metering plunger 17 is moved further to the right, thus unblocking the port 22 and permitting the molten metal M to flow into the sleeve and fill the void defined between the faces 28 and 29 of the plungers. It is apparent that the initial abutting relationship of the plungers precluded the existence of any significant volume of air between the opposed faces. When the plunger 17 is withdrawn from abutment with the plunger 16 within the sleeve 15, an air-free space or void is created within the sleeve which is filled by the incoming metal M as shown in Fig. 3.

It is to be noted that the transfer of the molten metal from the reservoir 23 may be accomplished by any suitable means, such as fluid pressure or physical displacement, all of which are well known to the art. A simple gravity flow of the metal is satisfactory for many purposes and I have accordingly illustrated the reservoir vessel 23 as being elevated above the metal entry port 22. The metal in the vessel 23, may, if desired, be contained under vacuum to eliminate dissolved gases, as is known in the art, and the gravity flow of the metal into the void between the plungers can, nevertheless, be utilized. When the reservoir is under atmospheric pressure or higher pressures, the void serves, in fact, to accelerate the gravity flow by reason of the pressur differential which will exist. As will appear hereinafter, a novel means of effecting the transfer of the metal may also be utilized.

Figure 3:
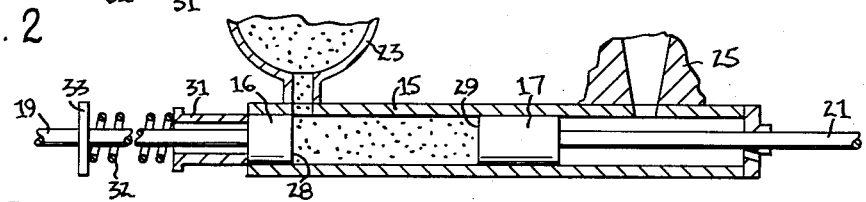

The plunger 17 is moved to a predetermined position, as in Fig. 3, which limits and defines the volume of molten metal which is to constitute the injection charge or shot. The desired volume of the shot is dependent upon the volume of the article to be cast, and the plunger 17 thus meters the charge so that the desired volume of the shot is obtained consistently and accurately.

Figure 4:
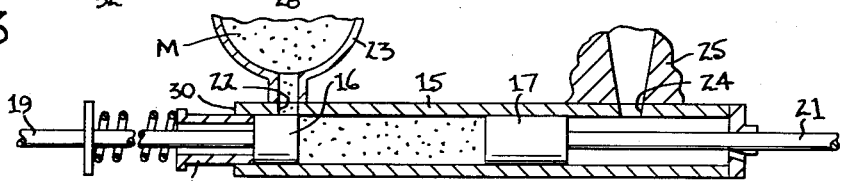
Figure 5:
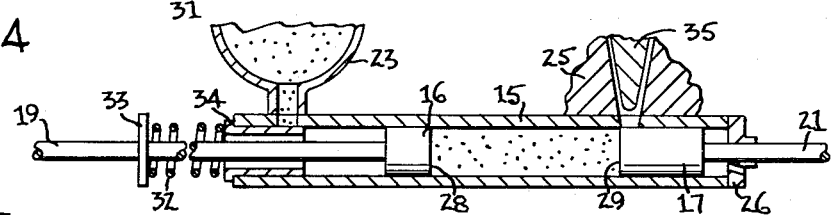

After the metering of the shot has been completed, both plungers are moved to the right simultaneously to cause a bodily transfer of the shot within the sleeve toward the injection port 24, as shown in Figs. 4 and 5. Under certain operative conditions, in which the plunger 17 exerts some light resistance to the foregoing movement, as will appear more fully hereinafter, the movement of plunger 16 from the position of Fig. 3 to the position of Fig. 4 will force some small quantity of metal M to return to the reservoir 23. However, this small volume of return can be compensated for in establishing the metering position of the plunger 17 so that a uniform shot volume is obtained in repetitive cycles of operation.

During the course of the foregoing movement of plungers 16 and 17, the air behind plunger 17 is vented through the vent aperture 27 in cap 26 so that no superatmospheric pressure is built up in the die 25 by reason of the transfer of the metal in the charging sleeve 15.

In the event that the aperture 27 is associated with a source of vacuum, then the die cavity, as well as the portion of sleeve behind the plunger 17, will be evacuated. The die cavity will be expcsed to the vacuum source until such time as the plunger 17 blocks the port 24, as in Fig. 5, thus sealing the die cavity from communication with the aperture 27.

Figure 6:
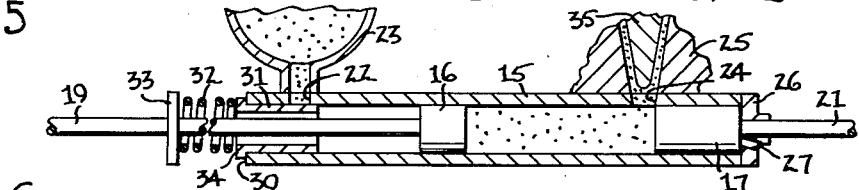

At the time or prior thereto, that the plunger 17 reaches the position shown in Fig. 5, it is usually desirable to accelerate the velocity of the plunger 16 to cause rapid injection of the metal M into the die cavity through port 24 which becomes exposed, as shown in Fig. 6, as the plunger 17 approaches the limit of its retraction stroke. It will be understood that the cylinder assemblies 18 and 20 can both be provided with conventional fluid cushioning arrangements so that undue shock or impact on these hydraulic cylinder assemblies at the limits of stroke will be avoided.

Figure 7:
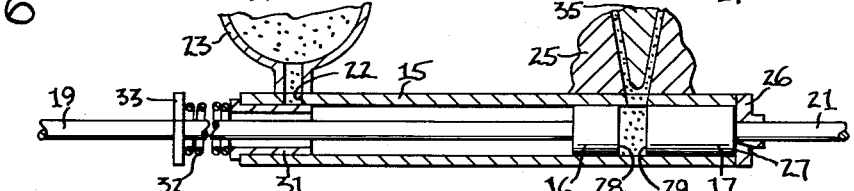

As the plunger 16 is advanced rapidly, the molten material M is injected under pressure into the die cavity until the cavity is filled, leaving a slight excess of metal M in the sleeve 15, as shown in Fig. 7. At this condition, the plunger 16 cannot displace any more metal M and its movement is arrested, except as some slight shrinkage of the metal occurs. As the plunger 16 moves from the position of Fig. 4 to the position of Fig. 7, it is necessary to keep the metal entry port 22 blocked so that no metal will flow into the sleeve 15. This, of course, can be accomplished by an external valve, as described hereinafter, or by providing a plunger 16 of sufficient longitudinal dimension so that it will maintain the port 22 blocked as the plunger 16 advances to the position of Fig. 7. However, I prefer to accomplish this function by means of a lost-motion-plunger extension or follower 31 which is slidably carried by the piston rod 19. A spring 32, mounted on the rod 19, has one end thereof bearing against a follower block 33 which is fixed to the rod 19. The other end of the spring 32 bears against the extension 31 and yieldably maintains it in abutment with the plunger 16. This abutment is maintained during advancing movement of the plunger 16 until a stop or flange 34 on the plunger extension 31 abuts the end of the sleeve 15 to prevent further movement, as shown in Fig. 5. The extension 31 thus serves to block the metal entry port 22 as the plunger 16 advances.

Figure 8:
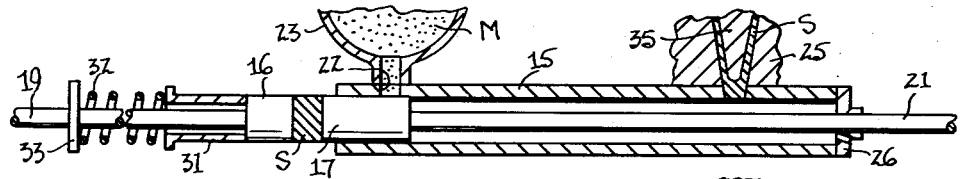
Figure 9:
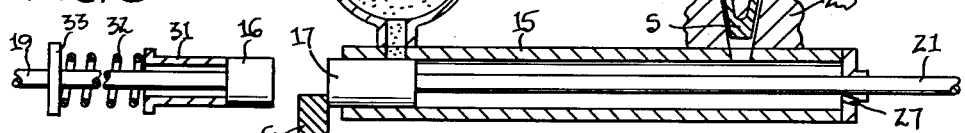

The plungers 16 and 17 are maintained in the positions shown in Fig. 7 until the molten metal M solidifies to form a biscuit or solid mass S. The chilling of the metal at this point can be accelerated by a water-cooled sprue-post 35 on the die 25. After the metal has chilled sufficiently, the plungers 16 and 17 are moved simultaneously to the left to shear the biscuit from the sprue and move it to a position where the face 29 of plunger 17 is outside of the sleeve 15, as shown in Fig. 8. In this position, the plunger 17 serves to block port 22. The solidified excess metal S which was left between the opposed faces of the plungers 16 and 17, is thus transferred to a point external of the sleeve 15 where it can drop off or be knocked off when plunger 16 is retracted, as shown in Fig. 9. This completes the cycle of operation, which can again be initiated by advancing the plunger 16 into abutment with plunger 17 as shown in Fig. 1.

Figure 10:
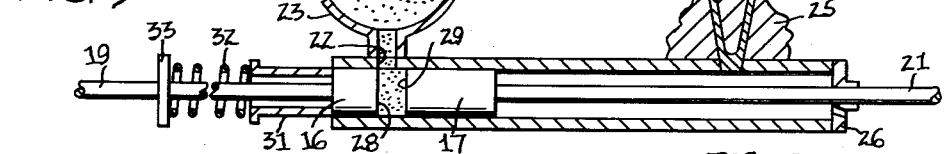
Figs. 10 and 11 are views of the apparatus of Figs. 1–9, inclusive, but illustrating an alternative sequence of operation.
Figure 11:
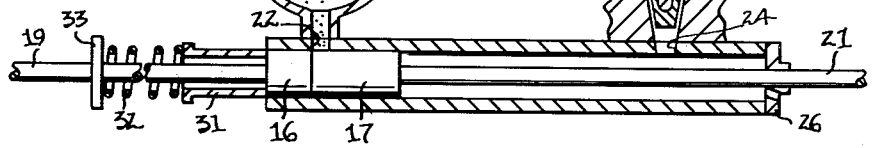

In Figs. 10 and 11 I have illustrated an alternative mode of operation which can be used instead of the method illustrated in Figs. 8 and 9. This alternative method has as its objective the salvaging of the excess shot metal by returning it in a molten state to the reservoir 23. This is accomplished by reducing the time in which the plungers are retained in the position of Fig. 7 and moving them to the position of Fig. 10 while the excess metal M is still molten. However sufficient time is allowed to permit the metal in port 24 to solidify. By use of the water-cooled sprue-post 35 the metal in the port 24 can be caused to solidify while the metal in the sleeve is still fluid.

After the plungers 16 and 17 have been returned to the position of Fig. 10, the plunger 16 is held against further movement and the plunger 17 is advanced, as shown in Fig. 11, to displace the metal M and return it to the reservoir 23 to complete the cycle of operation. Inasmuch as the plungers 16 and 17 are not, during the operating cycle, moved to a position exteriorly of the sleeve 15, there is no opportunity for air to come between the opposed faces 28, 29, of the plungers and it is therefore possible to initiate the new cycle from the position shown in Fig. 11, rather than from the position shown in Fig. 1. However, prior to the initial operation of the apparatus it is necessary to place the plungers initially in the position of Fig. 1 so that there will be no air between the opposed faces of the plungers 16 and 17. Thereafter the cycle of operation follows the sequence shown in Figs. 2 to 7, inclusive, and Figs. 10 and 11. The steps of Figs. 8, 9 and 1 are eliminated.

Figure 12:
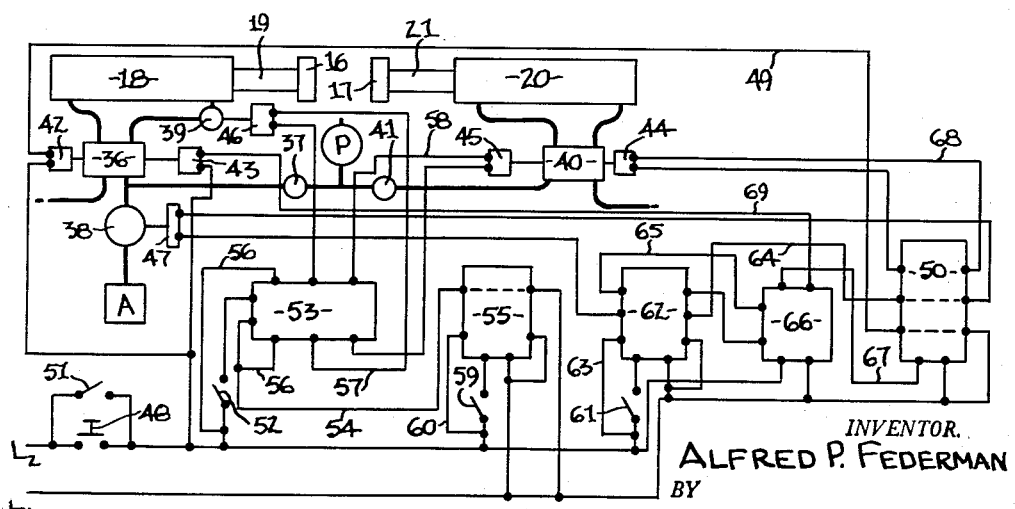
Fig. 12 is a diagrammatic representation of a control system for automatic operation of the apparatus shown in Figs. 1–9.

In Fig. 12 I have illustrated diagrammatically an automatic control system which could be utilized in connection with the operation of the apparatus of Figs. 1–9, inclusive. The double-acting cylinder assembly 18, which actuates plunger 16, is connected through a valve 36 and adjustable orifice valve 37 to a pump P. The hydraulic system also includes a pressure accumulator A which can be brought into operative association with the cylinder assembly 18 by means of a valve 38. A valve 39 is disposed intermediate the valve 36 and the retraction side of cylinder assembly 18 for the purpose of preventing fluid flow through the cylinder and thus locking the plunger against movement.

The double-acting cylinder assembly 20, which actuates plunger 17, is similarly connected through a valve 40 and adjustable orifice valve 41 to the pump P.

The valves 36 and 40 are both four-way, double-solenoid operated valves which are spring-centered for a normally-open center position. The reference characters 42 and 43 indicate the solenoids for valve 36, and the reference characters 44 and 45 indicate the solenoids for the valve 40. The energization of solenoids 42 or 44 cause advancing movement of their respective plungers 16 or 17, whereas the energization of solenoids 43 or 45 cause retraction of their respective plungers. When the solenoids are not energized, the hydraulic fluid is free to circulate through the valves in response to movement of the respective plungers 16 or 17.

The valve 39 is a two-way normally-open valve operated by a solenoid 46. The accumulator valve 38 is a directional, two-way normally-closed valve operated by a solenoid 47.

As shown in Fig. 12 the solenoids are electrically connected to appropriate elements of the circuit which will now be described.

The power lines are represented by the symbols $L_1$ and $L_2$. The circuit is energized by momentarily depressing a push-button starting switch 48 which causes energization of solenoid 42 through a normally-closed relay circuit 49 of an ejector relay 50. At this time it will be assumed that the plungers 16 and 17 are in the position shown in Fig. 9, and in this position, the rod 19 serves to engage and hold open a normally-closed cycle limit switch 51.

In response to energization of solenoid 42, the valve 36 operates to cause advance of the plunger 16 toward the plunger 17 until the two plungers are in abutment, as in Fig. 1. As soon as the plunger 16 has advanced slightly, it disengages from the limit switch 51 which then closes to maintain or hold the circuit when the starting switch or button 48 is released.

Inasmuch as the valve 40 has not been energized, the plunger 17 is free to move to the right, as in Fig. 2, in response to the thrust of the plunger 16, until the rod 19 engages and closes a metal port limit switch 52 which is normally open. The limit switch 52 closes the energization circuit to a metal port relay 53 through a normally-closed relay circuit 54 of a metering relay 55.

The energization of the metal port relay 53 closes a holding circuit 56 for the relay 53 and closes an energization circuit 57 for the solenoid 46, thus hydraulically locking the plunger 16 against further movement by the closure of valve 39. At the same time, the metal port relay 53 closes a circuit 58 to the solenoid 45 of valve 40 to cause retraction of the plunger 17. It is to be noted that the rate of movement of plungers 16 and 17 can be controlled, independently of each other, by appropriate settings of the orifice valves 37 and 41, respectively, which will restrict the volume of fluid flow from the pump to the cylinder assemblies.

The plunger 17 is retracted until the rod 21 engages and closes a normally-open metering limit switch 59. At this point the plungers are in the position shown in Fig. 3 and the molten metal shot charge has been drawn into the charging sleeve 15.

The metering limit switch 59 energizes the metering relay 55 which closes a holding circuit 60 for the relay 55 and also breaks or opens the normally-closed relay circuit 54 thus causing deenergization of the metal port relay 53. Thereby, the circuit 57 to solenoid 46 is broken and the circuit 58 to solenoid 45 is broken. This has the effect of opening valve 39 thus permitting renewed advance of the plunger 16, while plunger 17 is free to move in response thereto. Thus, the two plungers 16 and 17 move to the right until they approach the positions shown in Fig. 5. At this point, the rod 19 engages and closes a fast-shot limit switch 61, which is normally open.

The limit switch 61 energizes a fast-shot relay 62 which closes a holding circuit 63 and closes the circuit, through a normally-closed relay circuit 64 of relay 50, to the solenoid 47 of the accumulator valve 38. This opens the valve 38 to cause accelerated advance of the plunger 16 for the injection shot, as shown in Figs. 6 and 7. The relay 62 also closes a circuit 65 to a multi-circuit timer switch 66 to start the operation of the timer mechanism. The use of the accumulator A permits utilization of a pump P of smaller capacity than would otherwise be necessary.

After a preselected time interval, the timer switch 66 closes an energization circuit 67 to the ejector relay 50. The energization of the relay 50 causes the normally-closed relay circuits 49 and 64 to be opened, thus de-energizing the solenoid 42 and the solenoid 47. The valve 36 is thereby returned to a neutral or circulating position and the valve 38 is closed. At the same time, the relay 50 closes a circuit 68 to the solenoid 44 to cause advance of the plunger 17. The plunger 16 is free to move to the left in response thereto. This movement continues until the plunger 17 reaches its limit of stroke, as shown in Fig. 8.

The timer switch 66 now closes a circuit 69 to the solenoid 43 of valve 36 to cause retraction of the plunger 16, which permits removal of the biscuit. As plunger 16 is retracted to the position shown in Fig. 9, the rod 19 reengages the normally-closed cycle limit switch 51 to open it and thereby break the power circuit, thus completing the cycle.

It will be apparent that for the purpose of the alternative sequence of operation, as disclosed in Figs. 10 and 11, the principles of the above-described control circuit could readily be applied with appropriate modifications of position and timing in a manner known to persons skilled in the art.

Figure 13:
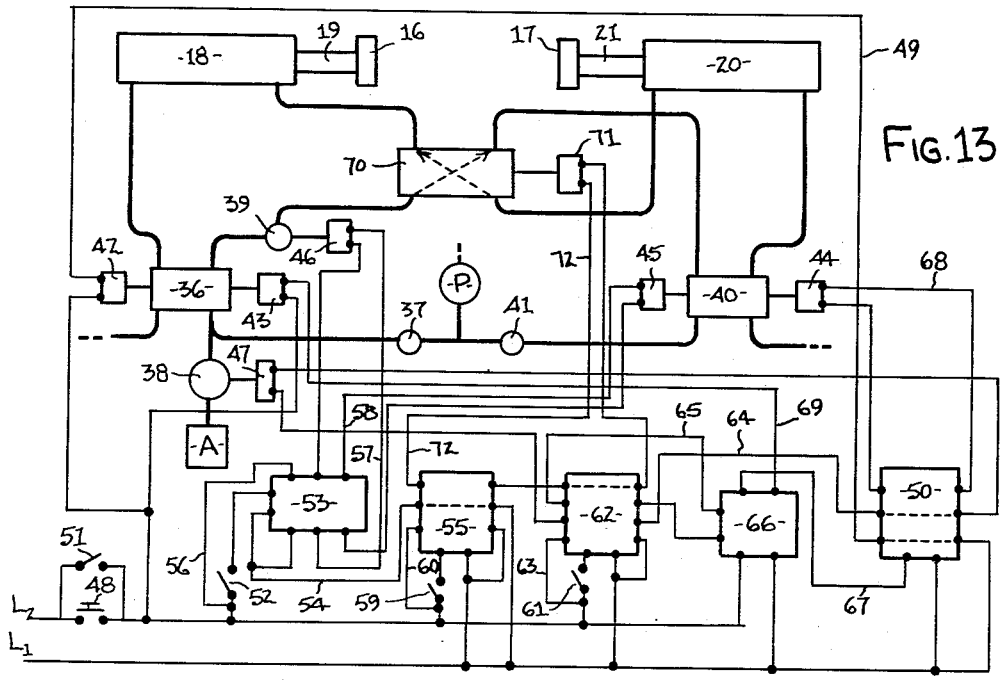
Fig. 13 is a diagrammatic representation of a modified control system for automatic operation of the apparatus shown in Figs. 1–9.

In Fig. 13, I have shown a modified form of the control system of Fig. 12 whereby the plungers 16 and 17 are selectively hydraulically coupled during a part of the operating cycle.

As previously mentioned, the plunger 17 may offer some initial resistance to free movement when the plunger 16 is advanced from the position of Fig. 3 to the position of Fig. 4. This resistance has the effect of causing some of the molten charge in the sleeve 15 to be forced back into the metal entry port 22 as the plunger 16 starts to advance, thus decreasing slightly the volume of the metered charge of metal. Ordinarily the small volume of returned metal is not of any significance in the casting operation and does not affect the uniformity of metering in repetitive operating cycles. However, under some circumstances, it may be necessary or preferable to avoid any such return of the metered charge at this point in the cycle. The servo-system disclosed in Fig. 13 may be utilized to accomplish that result.

The control system of Fig. 13 is identical with the system of Fig. 12 except that a four-way spring-opposed valve 70 and appropriate control mechanism therefor is added to the system. The valve 70 is connected on the retraction side of cylinder 18 between the valve 39 and the cylinder. The valve 70 is also connected to the retraction side of the opposed cylinder 20 between the valve 40 and the cylinder. The valve 70 is operated by a solenoid 71 which is connected to the power supply L$_1$—L$_2$ by a series circuit 72 which has a normally-closed contact through the fast-shot relay 62 and a normally-open contact through the metering relay 55.

The control system of Fig. 13 operates in the same manner as that of Fig. 12 until the retraction of plunger 17 has been completed, as in Fig. 3, and the metering relay 55 has been energized. The energization of the metering relay completes the circuit 72 to the solenoid 71 which actuates valve 70 to cause the low-pressure side of the cylinder 18 to be connected to the retraction side of cylinder 20. The valve 70 also connects the advance side of cylinder 20 with the valve 39. The cylinders 18 and 20 are thereby hydraulically coupled so that the advance of plunger 16 is synchronized with and reflected in the retraction of plunger 17 independently of the fluid body of molten metal which is disposed between the plungers 16 and 17 within the sleeve 15. In all other respects, the control system functions in the manner described in Fig. 12.

The slave movement of plunger 17 in response to movement of plunger 16 avoids any significant pressure on the body of molten metal in the sleeve 15 and thereby there is no tendency for any of the metal to be displaced into port 22 during the initial movement of plunger 16. The slave movement continues until the plunger 17 reaches the position, as in Fig. 5, where the fast-shot relay 62 is energized, as heretofore described. The energization of the relay 62 breaks the circuit 72 to solenoid 71 and permits the valve 70 to return to its normal position. In this position, as previously described, there is no hydraulic coupling between the cylinders or plungers. Thereafter the control system continues to function as previously described with reference to Fig. 12.

Figure 14:
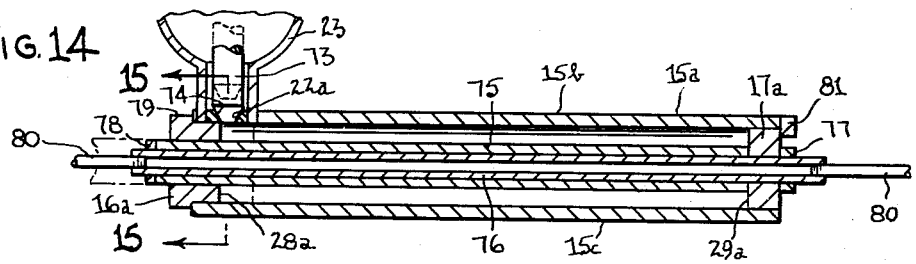
Fig. 14 is a sectional view of another form of apparatus in which the cast article is formed in the metering chamber.
Figure 15:
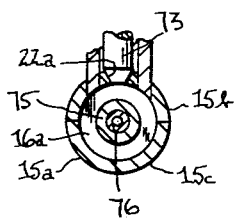
Fig. 15 is a vertical section taken as indicated on line 15—15 of Fig. 14.

In Figs. 14 and 15, I have shown another form of my invention which can be utilized for the casting of articles of uniform continuous cross-section. In this form, the charging sleeve 15a is separable along its diametrical plane and serves as the article-forming mold. The principles of operation of the apparatus of Fig. 14 are substantially the same as those of the apparatus of Figs. 1–9, except that the step of injection from the charging sleeve into a separate article-forming cavity is eliminated.

The hollow sleeve 15a consists of an upper half or section 15b and a lower half or section 15c which can be removably secured to each other by any suitable means known to the art. The sleeve 15a is illustrated as being of cylindrical form, however it will be understood that it may define an article cavity of any desired uniform cross-section, provided only that the cross-section be of such form that the cast article does not mechanically interlock with the sleeve 15a and thus prevent its removal from the sleeve. It is not necessary to provide the customary draft or taper in the sleeve. The plungers will be of a shape complementary to the cross-section of the sleeve 15a and are here shown as cylindrical.

The upper half 15b of the sleeve is apertured as at 22a to provide communication with a reservoir of molten material. The reservoir may be a suitable vessel or melting pot 23, the outlet of which is sealed by a valve 73 which seats on a conical valve seat 74.

A collapsible core 75 is slidably mounted on a water conduit or pipe 76 on which is slidably mounted a plunger 17a. The core 72 and plunger 17a are held in assembled relationship on the conduit 76 by means of a collar 77 fixed to the pipe 76 in abutment with plunger 17a, and a collar 78 fixed to the pipe 76 in abutment with the opposite end of the core 75. A plug 16a is slidably mounted on the core 75.

Both the plug 16a and the plunger 17a are of such form and size as to be complementary to the interior of the sleeve 15a and to have wiping engagement with the walls thereof. The plug 16a is, however, provided with a flanged portion 79 which serves as an abutment to limit the movement of the plug in the sleeve 15a.

The assembly of plug 16a, plunger 17a, core 75 and conduit 76 is slidably inserted into the sleeve, with the parts 16a and 17a in face-to-face abutment so that no significant volume of air is retained between the opposed faces 28a and 29a, respectively. Suitable conduits 80 can be connected to the ends of the pipe 76 to provide a water circulating system for cooling the casting. The plug 16a is preferably removably secured to the sleeve when it is in abutment therewith as shown in Fig. 14.

The valve 73 may now be lifted, as shown in broken lines, however the plunger 17a will prevent any flow of molten material into the sleeve. The plunger 17a is now retracted by moving it to the right thus defining a charge chamber between the opposed faces 28a and 29a. As the plunger 17a is retracted, the molten metal will fill the air-free void between the separating faces 28a and 29a. The movement of the plunger may be arrested at any predetermined position or its limit of stroke may be defined by an abutment 81 secured to the sleeve 15a. As the plunger 17a moves from the broken line position of Fig. 14 to the solid line position, the core 75 is drawn into the sleeve 15a from its broken line position exteriorly of the sleeve, and follows the movement of the plunger 17a.

When the plunger 17a has completed its movement, the valve 73 may be seated to displace any excess metal and to seal the metal entry port 22a. After a suitable time interval for solidification of the molten material, the sleeve 15a is disassembled and the cast article is removed. The collapsible core 75 is then removed in the conventional manner.

As shown in Fig. 15, the bottom of the valve 73 and of the valve seat 74 are contoured to conform to the shape of the plunger 17a so that no air entrapment at this point can occur.

It will be understood that the core 75 could alternatively be assembled in fixed relationship to the plug 16a instead of to the plunger 17a, in which case the core would slidably traverse the plunger 17a. It will also be understood that if a solid section is to be cast rather than a hollow one, then the core 75 may be eliminated, and the plug 16a and plunger 17a need not be provided with the axial bores shown.

By utilizing the apparatus of Fig. 14, an air-free chamber is provided for a metered charge of material to form an article of uniform cross-section. Oxidation and air entrapment of the molten material is eliminated and the density and appearance of the cast article are improved.

Figure 16:
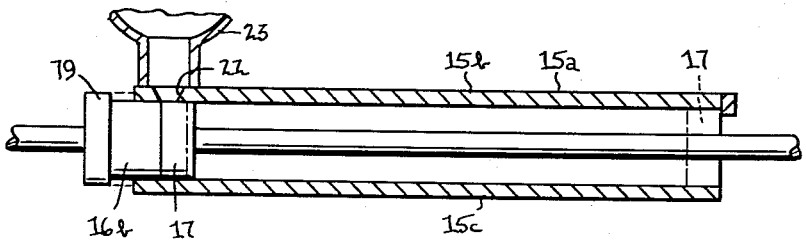
Fig. 16 is a view similar to Fig. 14 but showing a modified form of the apparatus.

In Fig. 16 I have shown a modification of the apparatus of Fig. 14 in which the external valving, such as valve 73, is eliminated. Instead, the plug 16b is extended in length so that it can be moved to a position where it serves as a valve for the metal entry port 22. This arrangement functions in a manner similar to that shown in Fig. 1, except that the sleeve 15a serves as the article mold as well as the metering or charging chamber.

As seen in Fig. 16, the plug 16b and the plunger 17 are inserted in the sleeve 15a in face-to-face abutment so that there is no air between the complementary faces. The plug 16b is not fully inserted, however, but is held in a position, as shown, whereby it does not seal the metal entry port 22. The port 22 is sealed by the plunger 17, either alone or in combination with plug 16b. The sleeve 15a is then charged with the molten metal by withdrawing the plunger 17 from the solid line position to the dotted line position, as described with reference to Fig. 14. As soon as retraction of plunger 17 is completed, the plug 16b is advanced until its flange 79 abuts the end of the sleeve. The end of the plug 16b advances to the dotted line position shown to block the port 22. During this movement, some of the molten metal in the sleeve is displaced and returned to its source through the port 22. Upon solidification, the molten metal produces an article of solid cross-section which can then be removed from the sleeve by ejection by plunger 17 or by disassembly of the halves 15b and 15c of the sleeve. As previously indicated with reference to Fig. 14, the cast article may have any uniform non-undercut cross-section, and the length of the article can be controlled by the retraction position of the plunger 17.

Figure 17:
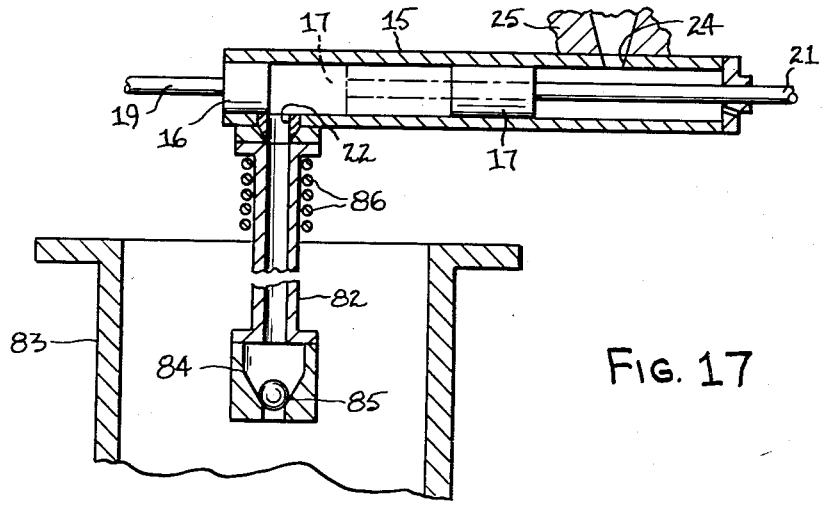
Fig. 17 is a sectional view showing details of a modified feeding arrangement for bringing molten material to the injection apparatus of Figs. 1–9.

In Fig. 17 I have shown a form of feed arrangement for the molten material which may be utilized with my invention instead of the gravity flow previously described. This form of feed raises the molten metal from a lower level to the level of the charging sleeve and thereby obviates any problems which might be created by the necessity of elevating a reservoir or melting pot to a level where gravity flow can be obtained.

By way of example, I have shown the charging sleeve of Figs. 1 to 9 connected to the feed device. However, it is to be understood that the feed device may be utilized in other forms of the invention which are based upon the principle of an air-free variable volume charging chamber.

The metal entry port 22 of sleeve 15 communicates with a dependent feed tube 82 which is suitably secured to the sleeve. The lower end of the tube 82 extends into a melting pot 83 or other suitable reservoir of molten metal, and is provided with a conical valve seat 84 to accommodate a ball valve 85. The ball 85 permits the flow of material upwardly in the tube 82 but prevents any downward counterflow, thus functioning as a check valve.

When the plunger 17 is withdrawn from the dotted line position to the solid line position (which was previously described with reference to Figs. 2 and 3) the molten metal is drawn upwardly in tube 82 and fills the void defined between the separating faces of plungers 16 and 17. It will be understood that initially the tube 82 will have to be primed so that it is completely filled with the molten metal, but thereafter the feed cycle can be repeated without further priming.

When the plunger 17 has reached the limit of its metering stroke, the plunger 16 is advanced as in Figs. 4 and 5 and the injection cycle is completed as previously described with reference to Figs. 6–9. During the initial advance of the plunger, as in Fig. 4, the ball check valve 85 prevents any return of the metal from the sleeve 15 into the tube 82.

When the modified cycle of operation of Figs. 10 and 11 is utilized, the molten metal of Fig. 10 is not returned to the tube 82, as indicated in Fig. 11, but is merely transferred to the position of Fig. 10 where it is heated by the incoming molten metal on the next feed cycle resulting from the retraction of plunger 17.

If necessary, any suitable means may be provided for preventing undue heat loss of the metal in tube 82. For example, heating coils 86 may be provided to encircle a part of the tube 82.

Figure 18:
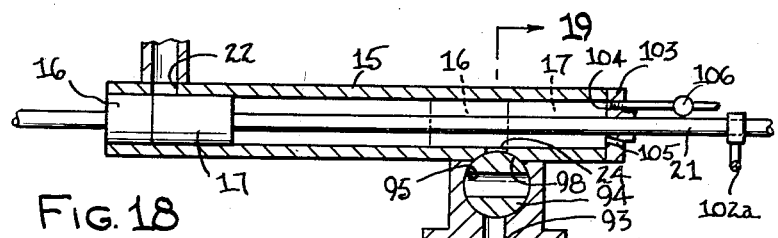
Fig. 18 is a sectional view showing an arrangement for utilizing the apparatus of Figs. 10 and 11 for non-pressure castings.
Figure 19:
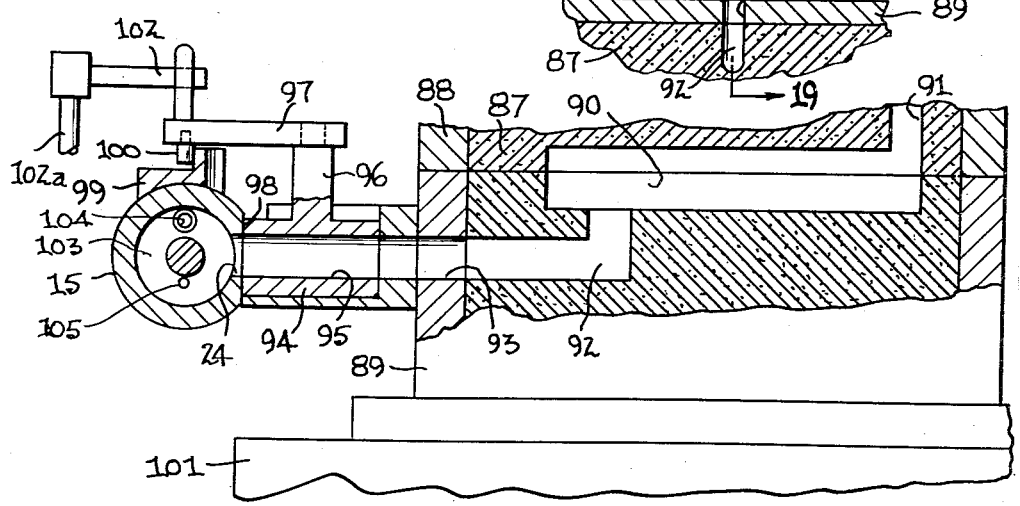
Fig. 19 is a cross-sectional view taken as indicated on line 19—19 of Fig. 18.

In Figs. 18 and 19, I have illustrated the manner in which the principles of my invention may be applied to produce non-pressure castings, such as sand castings. A sand mold 87 is formed in a two-part flask having an upper member 88 and a lower member 89 to provide an article forming cavity 90, as is conventional. The mold also provides a conventional vent passage 91 communicating with the cavity and a metal feed passageway or sprue 92 which as here shown, leads upward into the cavity 90 from a feed port 93 which is located on the side of the lower flask member 89.

A rotary valve 94 is mounted on the lower flask member and is provided with a diametrically extending bore 95 which can be brought into or out of registry with the port 93 by means of a handle 97 which is secured to a valve stem 96.

The sleeve 15 and plungers 16 and 17 are utilized to meter the charge of molten metal into the sleeve from the entry port 22, transfer it to the ejection port 24 and eject it, as heretofore described with reference to Figs. 10 and 11. However, inasmuch as the arrangement now described does not involve pressure casting, all of the charge in the sleeve 15 is ejected, there being no excess or biscuit to be disposed of or returned.

The sleeve 15 is machined externally, adjacent the port 24, to provide a cylindrical recess or socket 98 to accommodate the valve 94 and serve as a seat therefor. The sleeve also has affixed thereto a radius cam 99 which is substantially concentric with the axis of rotation of the valve 94 when the valve is seated in the recess 98. The cam 99 is engageable by a roller 100 which is rotatably secured to the valve handle 97.

In operation, the flask with its mold 87 is brought into position adjacent to the sleeve 15 manually or by any suitable conveying means and is supported by an adjustable table 101 or other support, by means of which the valve 94 can be brought into alignment with the port 24. The handle 97 is then rotated to engage the cam 99 and thereby force the valve 94 to seat in the socket 98 and lock the valve assembly to the sleeve 15. At the limit of this locking movement of the handle 97, the valve has been rotated to an open position as shown in Fig. 19. If the valve is not properly registered with the socket, the handle will not engage the cam 99.

The cycle of operation of the plungers 16 and 17 is then initiated, during which the molten metal is drawn into the void in sleeve 15 through entry port 22 in a measured volume of charge. The molten metal is then exposed to the port 24 and is ejected by movement of plunger 16 relatively to plunger 17 until the plungers are in abutment as indicated in dotted lines in Fig. 18. The charge of metal is thereby transferred from the sleeve 15 through valve 94 and sprue channel 92 upwardly into the article forming cavity 90 of the mold. A predetermined excess of metal is provided so that the metal will completely fill the cavity 90 and overflow into the vent passageway 91. During this transfer the metal has not been exposed to air and only has a single surface exposure to the displaced air or gas in the mold which corresponds to the cross-sectional area of the cavity 90.

Upon completion of the metal transfer and while the plunger 16 or 17 still overlies the port 24, the valve handle is rotated to close valve 94 and thus prevent any escape of the molten metal from the mold. The rotation of handle 97 also serves to release the valve from its locked engagement with sleeve 15 and permits the flask assembly to be removed for chilling and further processing, including cleaning and lubrication of the valve. As soon as the valve 94 is closed, the plunger 17 may be moved past port 24 and the plungers 16 and 17 are returned to port 22 for initiation of another cycle of operation.

The valve handle may be closed manually, or as indicated in Fig. 19, a unidirectional abutment 102 may be secured by linkage 102a to the rod 21 of plunger 17 to engage the handle 96 as soon as the plunger 17 commences its return stroke, thereby closing the valve before the plunger 17 exposes the port 24.

In order to avoid even the slight surface exposure of the metal to air in the mold itself, the air in the mold and in its metal entry passageways may be displaced by an inert heavier-than-air gas, such as nitrogen, prior to the transfer of the molten metal to the mold. As shown in Fig. 18, this may readily be accomplished by capping one end of the sleeve 15, as at 103, and providing the cap with a gas inlet port 104 and a small vent port 105. The port 104 is connected through valve 106 with a source of inert gas under pressure. After the flask and valve 94 have been connected to the sleeve 15, as described, the valve 106 is opened to permit the inert gas to enter the sleeve 15 behind the plunger 17 in at least sufficient volume to displace the air in the sleeve. This displaced air is forced out through the open port 24 into the mold cavity 90. Thereafter, the operational cycle of the plungers 16 and 17 is initiated, and as plunger 17 is retracted it forces the inert gas into the mold, thus displacing any remaining air in the mold. Some slight volume of inert gas will escape from the sleeve 15 through vent port 105, but this port is of such relatively small dimension that the major portion of the inert gas will be transferred to the mold. However, the vent 105 will permit all of the remaining gas behind plunger 17 to be vented after plunger 17 has passed port 24. In the subsequent injection of the molten charge into the mold, the molten metal will have a single surface exposure to the inert gas in the mold and will have no exposure to any air whatsoever. Thus, oxidation of the charge, even in non-pressure or open-vent casting, is completely eliminated.

It will be noted that the foregoing described method of non-pressure casting has the advantages, irrespective of whether inert gas is utilized or not, of (1) providing a predetermined metered charge of metal, (2) maintaining the metal out of contact with air during transfer to the mold and (3) feeding the metal into the mold from a level below that of the mold cavity.

In Figs. 20–28, I have shown a modification of the apparatus of Figs. 1–11 and 14–16 which may be utilized for hollow extrusions or extrusion castings which involve the progressive solidification of the molten material. Figs. 20–26 show a method and apparatus for producing a piece or unit casting from a single charge of material. Figs. 27–28 show a modified method of operation for producing a casting of greater mass or volume than can be produced from a single charge of molten material, thereby producing a continuous casting.

In Figs. 20–26 I have shown a sleeve 107, of cylindrical form, which is provided with a metal entry port 108 and thus is similar to the sleeve 15 heretofore described. One end of the sleeve is provided with an inwardly directed flange 109 to form an annular shoulder 110 on the sleeve and a bore 111 of reduced diameter. An outer form die 112, here shown as cylindrical in form, is slidably mounted in the bore 111 so that its inner end 113 is coextensive with the shoulder 110. The die 112 is releasably secured to the sleeve by one or more radial pins 114 and may be additionally retained against outward displacement by a flange or collar 115 on the end of the sleeve. The wall of the sleeve adjacent to the die 112 may be perforated or slotted as at 116 to permit air or water cooling of the die 112 during the casting operation.

Slidably mounted in the sleeve 107 is the injection plunger 16 and a metering plunger 117 which has been abutted with the plunger 16 to eliminate all air between the opposed faces thereof, as heretofore described. The plunger 16 is provided with actuating rod 19 which may be operatively connected to cylinder assembly 18. The plunger 16 may also have associated therewith the extension or follower 31 for sealing the metal entry port 108 after plunger 16 is advanced. In lieu thereof, the plunger 16 may be of sufficient longitudinal dimension, as shown, to overlie the port 108 during the advance or injection stroke.

The plunger 117 is provided with an axial stem 118 which serves as a core for the hollow article to be cast, and which may be slightly tapered toward its free end. The stem 118 may be hollow, if desired, to permit it to be cooled by a suitable cooling fluid. The stem 118 is adapted to be detachably coupled to the rod 21 of cylinder assembly 20 or other suitable actuating means. Adjacent to its juncture with the stem 118, the plunger 117 is provided with a series of relatively large, concentrically arranged, passageways or openings 119 which are adapted to register with the annular space 120 defined by the die 112 and the stem 118. In order to initially seal or block the openings 119, the holes are filled with the molten material to be cast before the plunger 117 is inserted into sleeve 107. After solidification, the molten material provides a series of plugs or inserts 121 having a common portion 122 of substantially the same cross-section as that of the annular space 120, which defines the wall thickness of the article to be cast.

The method of operation, as shown in Figs. 20–27, is very similar to that previously described with reference to Figs. 1–11.

Figures 20, 21:
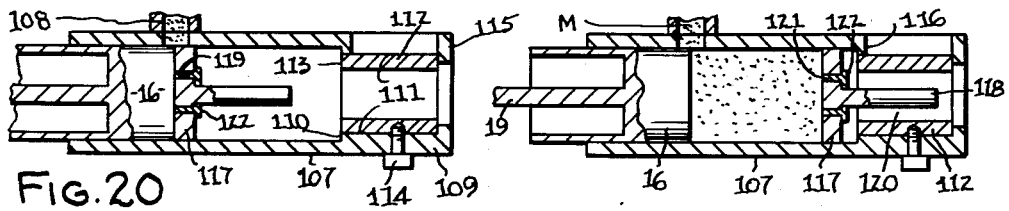
Figs. 20 to 26 are sectional views of a modified form of injection apparatus for the casting of extrudable shapes and illustrate the sequence of operation thereof.

In Fig. 20, the plunger 117, with its insert 121—122, is in abutment with plunger 16, and the abutting faces are in registry with the metal entry port 108. The molten metal is supplied to the port 108 by any suitable means, such as heretofore described. In Fig. 21, the metering plunger 117 is retracted while plunger 16 is held against movement, thus creating an expanding void chamber into which the charge of molten metal is drawn until the desired volume of metal is in the cylinder, at which point the movement of plunger 117 is arrested. It will be noted that the inserts 121 prevent any flow of the charge through the openings 119, although as the inserts are exposed to the heat of the molten metal, they may commence to soften slightly. The walls of openings 119 are preferably roughened or slightly tapered to prevent inadvertent displacement of the inserts 121.

Figure 22:
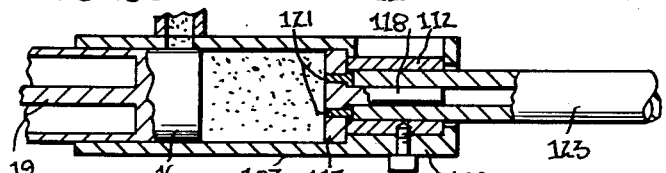

In Fig. 22, the plungers 16 and 117 are moved simultaneously to cause plunger 16 to block metal entry port 108 and to cause the plunger 117 to abut the sleeve shoulder 110. At this time, or just prior thereto, the stem 118 may be uncoupled from its actuating rod 21 and a tube 123, which slidably fits the annular space 120, is inserted as shown to provide a temporary resistance or reaction member to the ejection of the molten metal through openings 119.

Figure 23:
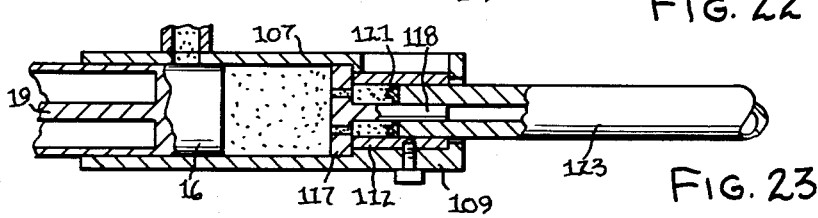

In Fig. 23, the plunger 16 is advanced to apply pressure to the charge and causes the inserts 121—122 to be forced out of the openings into the annular space 120 against the back pressure of the tube 123, which is slowly displaced. The molten charge follows the inserts into the space 120.

Figure 24:
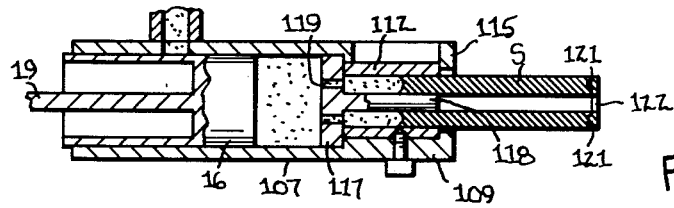

As the plunger 16 advances slowly, progressive solidification of the metal takes place in the space 120, as shown in Fig. 24, and the tube 123 is no longer required and can be withdrawn. The solidification or cooling of the metal can be accelerated by employing cooling means for the die 112 and the core 118, as previously indicated.

Figure 25:
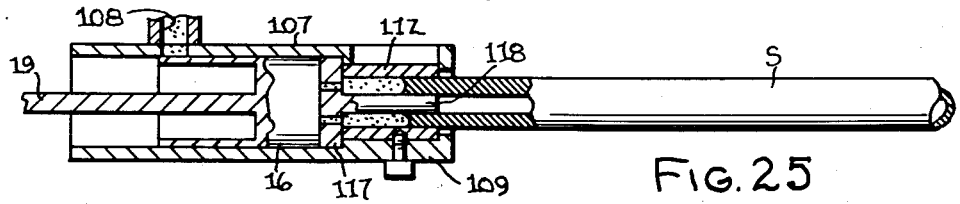
Figure 26:
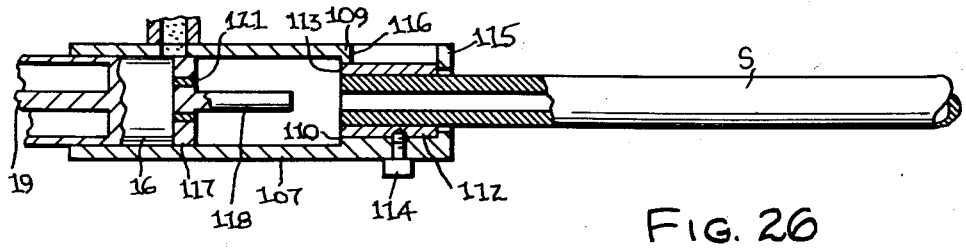

The plunger 16 continues to advance and progressive solidification of the cast article proceeds contemporaneously therewith until the plunger 16 has advanced into abutment with the plunger 117, as shown in Fig. 25. At this point, all of the charge, with the exception of the small quantity remaining in the openings 119 has been ejected. It will be understood that a table or roller conveyor or other known support means may be utilized to support the free end of the cast article as it is being formed. The plunger 16 is maintained in its fully advanced position until the metal has completely solidified. Then, the actuating rod 21 is again brought into operative association with the stem 118 of plunger 117 and the plunger 117 is advanced so that both plungers are returned to their initial position, as shown in Fig. 26, thus completing the cycle. During this movement, the cast article is retained against any following movement, and the solidified metal in the openings 119 is broken away from the body of the cast article thus providing inserts 121 for the next cycle of operation. The cast article then serves as the reaction member 123 for the next cycle of operation. In the alternative, the cast article could be withdrawn before the plungers are returned, and the original tube 123 could again be used as the reaction member, as previously described.

The foregoing described process produces a homogeneous pressure casting, free of air entrapment or oxidation, without the problems attendant upon the use of a sealed or closed die cavity. The desired internal and external dimensions of the casting are accurately maintained and the surfaces of the article are smooth, ordinarily requiring no further finishing. Although, I have described a method and apparatus for the production of a cylindrical hollow article, such as a bearing, it will be apparent that the die 112 and the core 118 may be of any desired form or shape which will produce an article of uniform cross-section.

If it is desired to produce a cast article of such length and mass that a single charge of molten material within the capacity of the sleeve 107 is inadequate for the purpose, then the method of Figs. 20–26 may be modified to produce a continuous casting, as shown in Figs. 27–28. The basic distinction between the method of Figs. 20–26 and the modified method of Figs. 27–28 lies in effecting concurrent or integrated movement of the outer form die 112 and the core 118 with the plunger 117. For this reason, the radial pin 114 is withdrawn so that the die 112 is not secured to the sleeves and is free to move relatively thereto.

The method described with reference to Figs. 20–25 may be employed to initiate the continuous casting cycle. Thereafter, as shown in Fig. 27, and in contrast to Fig. 26, the plungers 16 and 117 and the elements 112 and 118 are concurrently returned to the starting position in registry with entry port 108 as soon as the ejection stroke of plunger 16 has been completed, or even just prior thereto, so that a part of the charge in the space 120 still remains molten. The solidified portion of the partially cast article is moved or permitted to move simultaneously therewith.

The charge is then drawn by retraction of plunger 117 as shown in Fig. 28 and as previously described with reference to Fig. 21. Thereafter the plungers 16 and 117 are moved as described with reference to Figs. 22–25 and the cycle is completed as shown in Fig. 27. After the cycle of operation has once been initiated, the charge is not permitted to solidfy completely in the space 120, but the operation is timed so that each fresh charge in the sleeve 107 can commingle with molten material remaining from the preceding charge. By this method, repetitive cycles of operation produce a continuous cast article of any desired length.

The cast article may be removed or stripped from the die 112 at any time by following the method of Fig. 26 and reinserting the radial pin 114 to hold the die 112 against movement.

In the continuous casting method the actuating rod 21 or other actuating means may be coupled to the die 112 or to the cast article itself in lieu of coupling directly to the stem 118 of the plunger 117, as the solidified portion of the charge in space 120 serves to couple the parts 112, 118 and the cast article to each other for concurrent movement.

In Figs. 27–28 I have shown the same form of apparatus as in Figs. 20–26 to indicate that the method of continuous casting can utilize the same apparatus as the method of unit or single-charge casting. If the apparatus is to be used solely for continuous casting, the die 112 may be physically secured to the plunger 117 so that both the core 118 and the die 112 are integrated with the plunger 117. The charge capacity of the sleeve 107 may also be decreased by disposing the entry port 108 closer to the shoulder 110, thereby shortening the stroke of the plungers and reducing the time interval for each cycle. If a solid, rather than a hollow, article is desired, the inner form core 118 can be eliminated.

I have heretofore described the non-pressure casting of an article of uniform cross-section (Figs. 14–16) and the pressure casting of an article of uniform cross-section (Figs. 20–28), these articles being, by way of example, bearings or the like. In Figs. 29–32 I have illustrated the application of the principles of my invention to the casting of an article having a portion thereof of one uniform cross-section and terminating in a portion having another uniform cross-section, as for example, a flanged bearing.

To accomplish the casting of a flanged bearing, I utilize a charging sleeve 124 having a permanent core 125 mounted therein and extending axially thereof past a metal entry port 126, which is provided in the wall of the sleeve. A cap 127 on one end of the sleeve may serve to support the core 125. Slidably engaging the sleeve 124 and the core 125 are two opposed plungers. One of such plungers 128 serves to seal or close the open end of the sleeve 124 and may be actuated by a rod 129 operatively connected to a hydraulic cylinder assembly 130. The other of the plungers 131 includes two relatively movable plunger elements; an outer element 131a and an inner element 131b. The outer element 131a is coupled to an actuating rod 132 operated by a hydraulic cylinder assembly 133. The inner element 131b is coupled to an actuating rod 134 operated by a hydraulic cylinder assembly 135.

Initially, the plungers 128 and 131 are brought into abutment exteriorly of the sleeve 124 and are then moved into the sleeve into registry with the metal entry port 126, as shown in Fig. 29. During this movement, the air in the hollow central portions of the plungers is displaced by the core 125 and is vented to atmosphere through radial openings 136 provided in a stem portion 137 of plunger 128.

The plunger 131 is then retracted by means of actuating rods 132 and 134 to draw the molten material from the port 126 into the void chamber defined between the faces of the plungers 128 and 131. During this movement of plunger 131, the plunger 128 is held against following movement. The movement of the outer element 131a of plunger 131 is arrested at a predetermined point which will correspond to the desired thickness of the flange on the finished cast article. However, the retraction of the inner plunger element 131b is continued, thus creating an annular void between the core 125 and the outer plunger element 131a into which the molten charge continues to be drawn. The movement of plunger element 131b is terminated at a predetermined position which will produce the desired length of the cast article. The parts are then in the position shown in Fig. 30. If a form of external valving, as heretofore described, is utilized to seal the metal entry port 126, then the charge can be permitted to solidify in the position shown in Fig. 30. Thereafter the plungers are moved to the position of Fig. 32 and the cast article is ejected.

However, if one of the plungers, for example plunger 131, is to be utilized as the valve means for blocking the metal entry port 126, then the plungers 128, 131a and 131b are concurrently moved to the left, as shown in Fig. 31, so that plunger element 131a blocks the port 126. Thereafter, the charge is permitted to solidify.

After the cast article has solidified, the plunger elements 131a and 131b are advanced as shown in Fig. 32 to strip the cast article from the core 125 and project it exteriorly of the sleeve 124. Thereafter, the plunger 128 may be retracted and the cast article may be removed, thus completing the cycle.

The plungers 128 and 131 are then brought into abutment exteriorly of the sleeve to initiate a new cycle of operation, as previously described. The cast article produced by this method is free of oxidation or air entrapment and has a smooth surface finish. Although the method has been described in relationship to the production of a flanged bearing of cylindrical form, it will be apparent that other shapes and forms of multiple uniform cross-sections could likewise be produced in accordance with the principles described.

Figure 33:
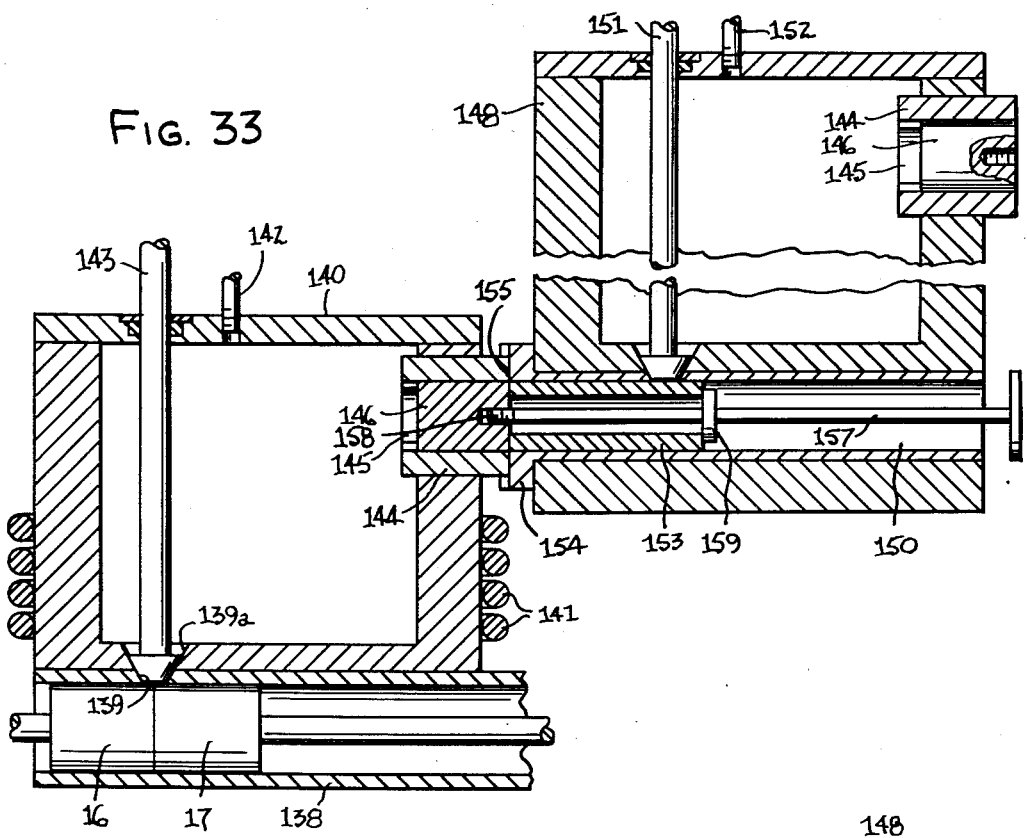
Figs. 33 and 34 are sectional views of metal transfer means which utilize the principles of my invention.
Figure 34:
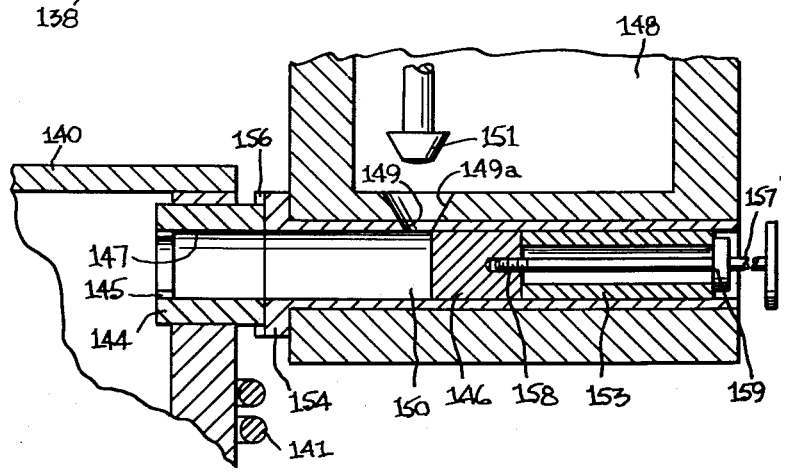

The principle of employing abutting plungers to displace air in a charging sleeve or article-forming cavity, as heretofore described in connection with the production of cast articles, can also be utilized to facilitate the transfer of molten material from the melting furnaces or vessels to the molding or casting apparatus. Such controlled transfer, which excludes contact with atmosphere, has especial utility in those instances where the molten material is initially placed under vacuum to rid it of dissolved gases. In Figs. 33–34 I have shown such a metal transfer system.

In Fig. 33 I have shown a charging sleeve 138 provided with a metal entry port 139. The sleeve 138 is an element of any of the forms of feeding and casting apparatus which I have heretofore described. Mounted on the sleeve 138 is a holding furnace or reservoir 140 for molten metal to be charged into the sleeve 138. The reservoir is sealed and may be provided with suitable heating means, such as electrical coils 141, to maintain the metal in a molten state. The interior of the reservoir 140 communicates, as at 142, with a vacuum source which maintains the molten metal under sub-atmospheric pressure. An external valve 143 can be used to open and close an outlet port 139a, although, as heretofore mentioned, the plungers in the sleeve may also serve as the valve for the metal entry port 139.

The reservoir 140 is also provided, at one side, with a coupling sleeve 144 having a slotted internal flange 145 at the inner end thereof. The coupling sleeve traverses the wall of the reservoir and communicates with the interior thereof. It is sealed or blocked by a plug or plunger 146, which fits slidably in the bore 147 of the coupling sleeve and is maintained in abutment with the flange 145 by atmospheric pressure.

As the molten metal in the reservoir 140 is withdrawn and charged into the sleeve 138 during the operational cycles of the casting apparatus, the metal reaches a level at which replenishment of the reservoir is necessary. For purposes of replenishment, I provide a distribution ladle or pot 148 which can be transported by a suitable means, such as trolley crane or lift truck, to any one of several reservoirs 140 as the need arises. The distribution ladle 148 is also sealed and is provided with an outlet port 149a which is in registry with a port 149 provided in the wall of a transfer sleeve 150 which is secured to and forms part of the distribution ladle. A valve 151 serves to open and close the outlet port 149a. The ladle 148 also has means 152 for connecting it to a source of vacuum so that its contents can be maintained at sub-atmospheric pressure.

A hollow plunger 153 is slidably mounted in the transfer sleeve 150 and normally seals the entry port 149. The end of the sleeve 150 is flanged outwardly as at 154 and the flanged portion is recessed as at 155 to provide a seat for the coupling sleeve 144. The bores of the coupling sleeve 144 and of the transfer sleeve 150 are of the same dimension.

When molten metal is to be transferred from the distribution ladle 148 to the reservoir 140, the ladle is transported and guided into the position shown in Fig. 33 wherein the coupling sleeve seats in the transfer sleeve. Peripheral radial notches 156 are formed on flange 154 to permit all air to be vented from recess 155 as the two sleeves 144 and 150 are brought into abutment.

A rod 157 is then projected through the bore of the hollow plunger 153 and is secured to the plunger 146 as by the threaded engagement shown at 158. A collar 159 on the rod engages the end of the plunger 153 and serves to hold it securely in abutment with the plug 146. The rod 157 is then retracted, as shown in Fig. 34, and the plug 146 and plunger 153 move therewith to expose the port 149 to communication with the interior of reservoir 140. It will be noted that the plug 146 displaces any air in its path of movement. The valve 151 is raised to open the port 149a and the molten metal under vacuum will flow by gravity from the distribution ladle 148 into the holding furnace or reservoir 140.

When sufficient molten metal has been transferred, the valve 151 is closed and the parts 146 and 153 are returned to the position of Fig. 33 by the rod 157. The rod 157 is then uncoupled from the plug 146 and the distribution ladle 148 may be transported to another location to replenish another reservoir 140.

The distribution ladle may also be provided with a coupling sleeve 144 and plunger 146, so that, by the method herein described, molten metal under vacuum can be transferred from a properly equipped melting furnace to the ladle. Thus, the molten metal is maintained out of any contact with air during the entire transfer operation to the casting machine. This method of transfer can, as previously indicated, also be utilized even if the metal is transferred at atmospheric pressure, as it prevents oxidation and air entrapment in the molten metal.

Although the transfer device has been shown in the drawings as mounted on the side of the reservoir and of the distributing ladle, such showing is exemplary only, as it will be apparent that said device and arrangement may be suitably mounted either vertically, horizontally or angularly on such portions of the metal-containing vessels as is deemed desirable and practicable.

Referring now to Figs. 35–38, I have shown the principles of my invention applied in modification of a conventional gooseneck type of metal feed and pressure die-casting operation. Although this form of the invention may be utilized without evacuation of the die cavity, it produces optimum results when associated with evacuation of the cavity.

Figure 35:
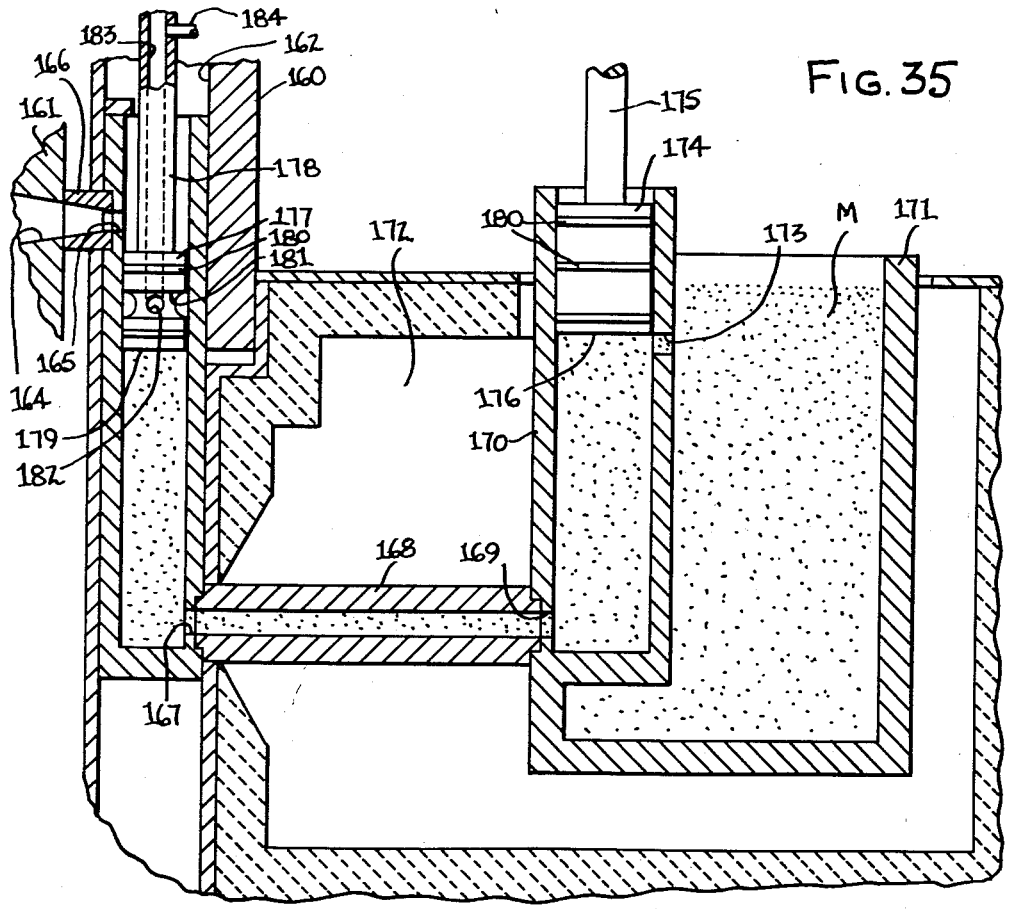
Figs. 35 to 38 are fragmentary sectional views showing a modified form of goose-neck feeding mechanism embodying my invention.
Figures 36, 37, 38:
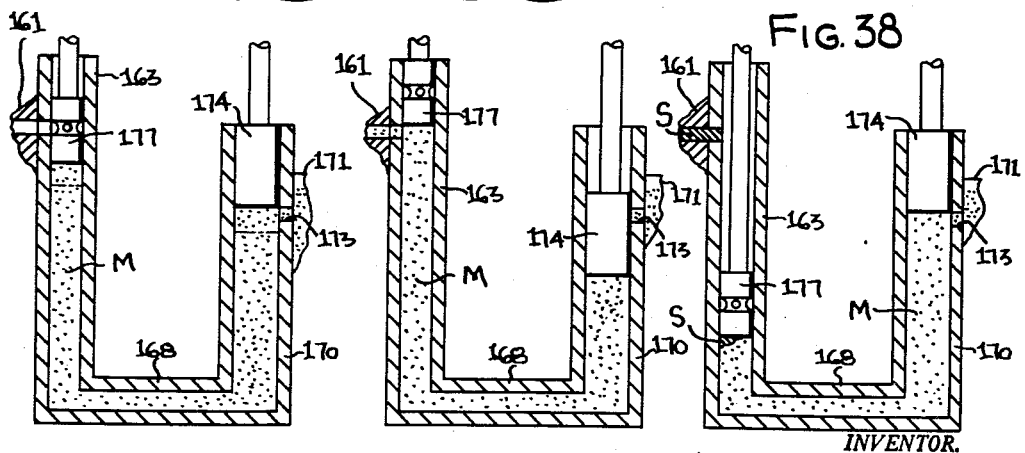

An example of a structural arrangement embodying these principles is disclosed in Fig. 35. Diagrammatic representations of the sequence of operations are shown in Figs. 36–38.

The reference character 160 designates a stationary die platen of a conventional pressure die-casting apparatus, having a stationary die-half 161 suitably secured thereto. The platen 160 is bored or hollowed out transversely thereof, as at 162, to accommodate a vertically extending charging sleeve 163, which communicates with the sprue hole 164 of the die-half through a discharge or injection port 165 provided in the wall of the sleeve. A sprue button 166 may serve to interconnect the openings 164 and 165.

The lower portion of the sleeve 163 is apertured as at 167 for communication with a conduit or nozzle 168 which extends horizontally into communication, through aperture 169, with a vertically extending pot sleeve 170. The sleeve 170 forms part of a holding pot 171 for molten metal which is maintained at proper temperature by a furnace 172. The interior of the sleeve 170 communicates with the metal in the pot by means of a metal entry port 173 in the wall of the sleeve. The level of the molten metal M in the pot is normally maintained above the level of the port 173. The sleeve 163 and the conduit 168 and the sleeve 170 thus together provide a U-shaped sleeve or chamber for containing a U-shaped column of molten metal which flows thereinto from the pot 171 through the submerged entry port 173.

A shot plunger 174 is slidably mounted in the pot sleeve 170 and is connected by a rod 175 to suitable actuating means, such as the hydraulic cylinder mechanism heretofore described. The face 176 of the plunger 174 is in contact with the molten metal M in the sleeve 170 at a level which is normally or initially intermediate the entry port 173 and the level of the metal in the pot, as shown in Fig. 35.

A draw plunger 177 is slidably mounted in the charging sleeve 163 and is connected by a rod 178 to suitable actuating means, such as the hydraulic cylinder mechanism heretofore described. The face 179 of plunger 177 is in contact with the molten metal in the sleeve 163 in opposition to the shot plunger 174 and likewise normally below the metal level in the pot, as shown in Fig. 35. Both the plungers 174 and 177 may be provided with sealing rings 180, if desired, to minimize leakage or seepage.

The draw plunger 177 is provided with a circumferential groove or recess 181 which communicates through radial port 182 and axial bore 183 with an external vacuum source 184. As heretofore noted, I prefer that the apparatus provide for evacuation of the die cavity, but my invention has utility even if no provision for evacuation is made. However, in the description which follows I will include a description of a die-casting process utilizing vacuum.

In Fig. 35, the plungers 174 and 177 are shown as they would be at the start of an operating cycle, with their faces in opposed relationship on opposite ends of the U-shaped column of molten metal M and below the level of the contents of the pot 171. The position of shot plunger 174 is such as to leave the metal entry port 173 with free communication between the metal in the pot and metal in the sleeves. The position of the draw plunger 177 is such as to block the injection port 165 from communication with the metal in the sleeves. The port 165 is preferably located above the level of the molten metal in the pot 171.

As shown in Fig. 36, the plunger 177 is then drawn upwardly, as the dies are closed, to bring the groove 181 into registry with the sprue hole 164 and thus expose the die cavity to the vacuum source. This movement of the draw plunger 177 can be accomplished by two different methods. The plunger may be retracted by actuation of rod 178 while the plunger 174 is maintained in the position shown in Figs. 35 and 36. This upward movement of draw plunger 177 causes an additional flow of metal through entry port 173 into the sleeves, thus in effect, increasing the volume of the available charge of metal in the U-shaped chamber. Alternatively, the shot plunger 174 can be advanced to the dotted line position, shown in Fig. 36, which is below the entry port 173. The pressure on the column of molten metal then causes responsive displacement of the draw plunger 177 to the desired position. It is also to be understood that the draw plunger could be suitably lengthened, as indicated by the dotted line in Fig. 36, so that its initial position would expose the die to the vacuum source. In such case, the first step of bringing the plunger 177 into evacuation registry with the die, as shown in Fig. 36, would not be required.

After the die cavity has been evacuated by exposure to the vacuum producing source, the shot plunger is advanced from the position of Fig. 36 to the position of Fig. 37. The molten metal in the chamber is thus cut off from communication with the metal entry port 173 and pressure is exerted upon the charge of molten metal. The column of metal is displaced until the draw plunger 177 reaches the limit of its responsive retraction movement, thus exposing the injection port 165 to the charge of metal. The continued advance of the shot plunger 174 causes the molten metal to be injected into the evacuated die cavity until it is completely filled. At this point the plunger 174 has completed its movement, as shown in Fig. 37.

The plungers 174 and 177 are maintained in the positions of Fig. 37 for a sufficient time interval to permit the injected metal to solidify as indicated at S in Fig. 38. Thereafter, the plunger 177 is advanced to shear off any residual solidified metal which might have formed in the sleeve 163. As the plunger 177 advances there is a responsive retraction of the shot plunger 174 until the shot plunger passes and exposes the metal entry port 173. The advancing movement of the draw plunger 177 can then be terminated, and the parts are in the position shown in Fig. 38. During this interval the dies may be separated and the formed article may be ejected. Any residue of solidified metal in the sleeve will be remelted.

The draw plunger 177 is now retracted while the shot plunger 174 maintains the position of Figs. 38 and 35. The retraction of plunger 177 permits an additional charge of molten metal to flow into the U-shaped charging chamber from the pot 171 through the exposed metal entry port 173. The plunger 177 is retracted to the position shown in Fig. 35 thus completing the cycle of operation.

It will be noted that the principles employed in the application of my invention to a goose-neck type of feed system, as shown in Figs. 35–38, are essentially the same as those previously described with reference to Figs. 10 and 11. However, instead of returning all the excess charge of metal in the sleeve to the reservoir, as in Fig.

10, I retain the excess metal within the sleeve and replenish the charge from the reservoir, as in Figs. 38 and 35. Thus, the disclosures of Figs. 35–38 is merely a modification of the disclosure of Figs. 1–6 and 10–11, in which the straight line charging sleeve of uniform cross-section is replaced by a non-linear sleeve which does not necessarily have a uniform cross-section. The embodiment of Figs. 35–38 thus provides for air-free feeding and injection of the die-casting metal, with the dual plunger arrangement serving to define the charging sleeve or chamber and also functioning as valves for the ports 165 and 173, as well as for the vacuum port 181–182.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. A method for feeding molten material to an article-forming cavity, comprising the steps of loading a charge of molten material in a vessel having communication with a charging sleeve, inserting a separable block of solid material into said charging sleeve to displace air from a portion of said sleeve, separating said block within said sleeve to create a gas-free chamber within said sleeve while simultaneously exposing said chamber to communication with said vessel, transferring a portion of said molten material into said chamber while maintaining said transferred material out of contact with air, thereafter sealing said chamber from communication with said vessel, and transferring said molten material from said chamber to an article-forming cavity brought in communication therewith.

2. A method for feeding molten material to an article-forming cavity, comprising the steps of loading a charge of molten material in a vessel having communication with a charging sleeve, inserting a separable block of solid material into said charging sleeve to displace air from a portion of said sleeve, separating said block within said sleeve to form an air-free chamber therein while simultaneously exposing said chamber to communication with said vessel, transferring a portion of said molten material from said vessel into said chamber while maintaining said transferred material out of communication with said article-forming cavity, thereafter sealing said chamber from communication with said vessel, displacing some of said molten material from said chamber into an article-forming cavity brought into communication therewith, moving said separated block and the remaining material in said chamber to the exterior of said sleeve, removing said remaining material, and bringing the separated portions of said block into abutment with each other.

3. A method for feeding molten material to an article-forming cavity, comprising the steps of loading a charge of molten material in a vessel having communication with a charging sleeve, inserting a separable block of solid material into said sleeve to displace air from a portion of said sleeve, separating said block within said sleeve to create a gas-free chamber therein while simultaneously exposing said chamber to communication with said vessel, transferring a portion of said charge from said vessel to said chamber, thereafter sealing said vessel from communication with said chamber, displacing some of said molten material from said chamber into an article-forming cavity communicating therewith, moving said chamber and the remaining material confined therein to a position out of communication with said article-forming cavity, removing said remaining material from said sleeve, and moving the separated portions of said block into abutment with each other.

4. A method for feeding molten material to an article-forming cavity, comprising the steps of loading a charge of molten material in a vessel, filling at least a portion of said cavity with solid matter to displace all gases from said filled portion, bringing said filled portion of said article-forming cavity into communication with said charge of molten material, initiating movement of said solid matter relatively to said cavity to expose progressively greater volumes of said article-forming cavity to said molten material, while simultaneously with said initiation transferring said molten material into said cavity and maintaining said material out of contact with air, and cooling said transferred material after it has filled said article-forming cavity.

5. A method for feeding molten material to an article-forming cavity, comprising the steps of loading molten material in a vessel, initiating the physical expansion of a gas-free chamber while simultaneously with said initiation transferring the molten material to said expanding chamber from said vessel while maintaining said transferred material out of contact with air, sealing said chamber from communication with said vessel, moving said expanded chamber and the molten material contained therein into communication with an article-forming cavity, and transferring said material to the article-forming cavity.

6. A method for feeding molten material to an article-forming cavity comprising the steps of maintaining a charge of molten material in a vessel having communication with a metal-receiving body, moving a separable block of solid material in said body to displace air from at least a portion of said body, separating said block within said body to create a gas-free chamber within said body while simultaneously exposing said chamber to communication with said vessel, transferring molten material from said vessel into said chamber while maintaining said transferred material out of contact with air, sealing said chamber from communication with said vessel, and exposing said molten material to the surfaces of an article-forming cavity.

7. A method as defined in claim 6 wherein said chamber provides the surfaces of said article-forming cavity.

8. A method as defined in claim 7 including the steps of first separating said block to define a chamber of one predetermined cross-sectional area, and then further separating portion of said block to define a contiguous extension of said chamber having a cross-sectional area different than said first-named area.

9. A method for feeding molten material to an article-forming cavity, comprising the steps of maintaining molten material in a vessel having communication with a charging sleeve, providing a separable block of solid material in said charging sleeve to displace air from at least a portion of said sleeve, separating said block within said sleeve to create a gas-free chamber therein while simultaneously exposing said chamber to communication with said vessel, transferring molten material from said vessel to said chamber while maintaining said transferred material out of contact with air, sealing said chamber from communication with said vessel, and transferring said molten material from said chamber through an apertured portion of said separated block into an article-forming cavity communicating therewith.

10. A method as defined in claim 9 including the step of utilizing the heat of said molten material to melt a fusible portion of said block to provide said apertured portion thereof.

11. A method as defined in claim 9 including the steps of moving the separable portions of said block relatively to each other to transfer said molten material from said chamber to said article-forming cavity, thereafter, maintaining the relative position of said separable portions of said block to each other while simultaneously moving said separable portions and said article-forming cavity to a position where said chamber is again in communication with the molten material in said vessel.

(References on following page)

References Cited in the file of this patent

UNITED STATES PATENTS

| | | | |
|---|---|---|---|
| 2,137,764 | Wagner | Nov. 22, | 1938 |
| 2,206,211 | Wagner | July 2, | 1940 |
| 2,401,491 | Lyons | June 4, | 1946 |
| 2,409,779 | McWane et al. | Oct. 22, | 1946 |
| 2,500,556 | Mallach | Mar. 14, | 1950 |
| 2,571,033 | Harter et al. | Oct. 9, | 1951 |
| 2,572,037 | Keating | Oct. 23, | 1951 |
| 2,582,137 | Kux | Jan. 8, | 1952 |
| 2,610,372 | Schroeder | Sept. 16, | 1952 |
| 2,649,693 | Venus | Aug. 25, | 1953 |
| 2,662,256 | Gagne | Dec. 15, | 1953 |
| 2,787,817 | Brennan | Apr. 9, | 1957 |
| 2,837,792 | Ring | June 10, | 1958 |

FOREIGN PATENTS

| | | | |
|---|---|---|---|
| 370,613 | Germany | Mar. 5, | 1923 |